H. R. HAWKINS.
Seeder and Fertilizer.
No. 231,570.  Patented Aug. 24, 1880.
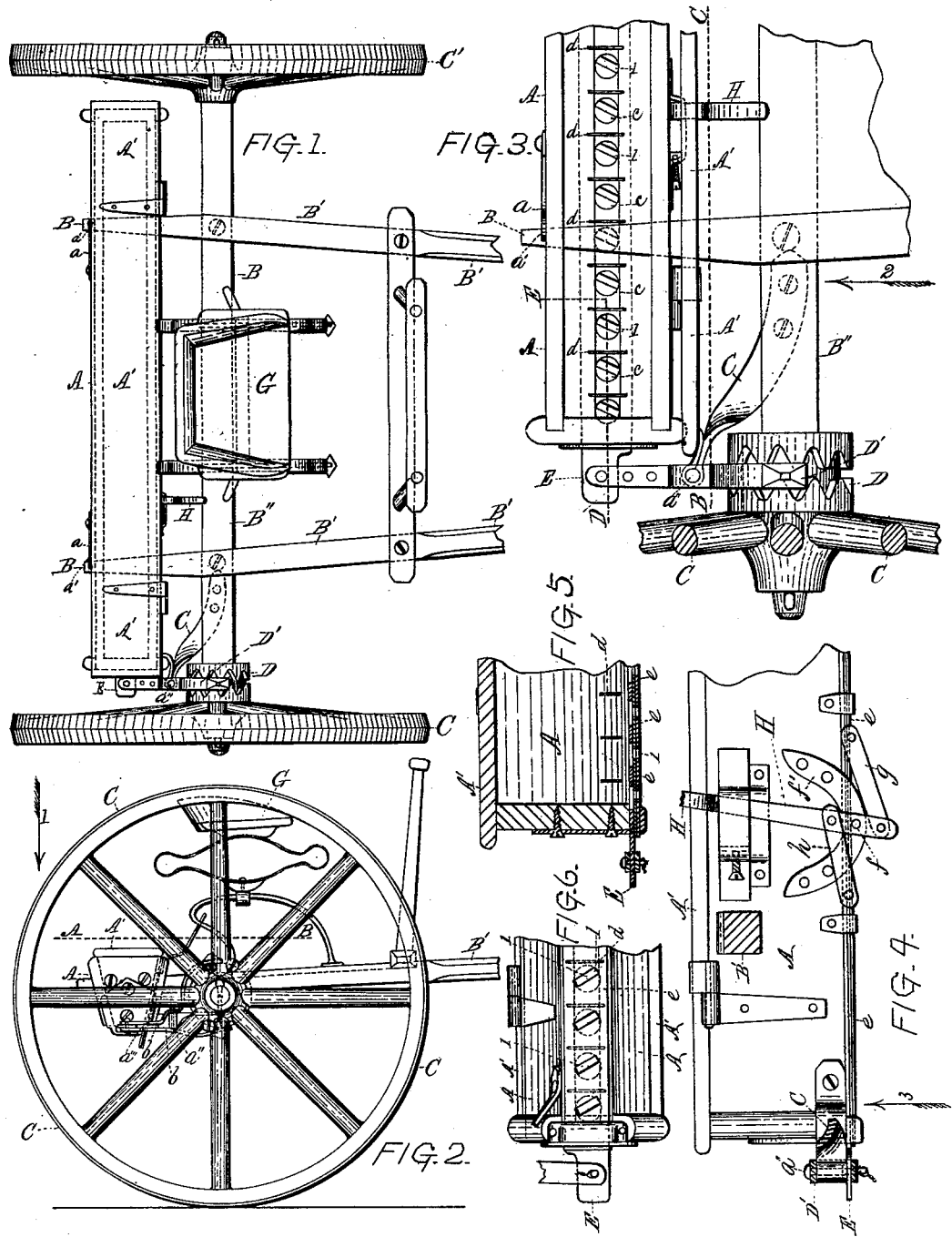
Witnesses:
H. W. Hawkins
J. W. Hawkins
Inventor:
Horace R. Hawkins

UNITED STATES PATENT OFFICE.

HORACE R. HAWKINS, OF AKRON, OHIO.

SEEDER AND FERTILIZER.

SPECIFICATION forming part of Letters Patent No. 231,570, dated August 24, 1880.

Application filed June 5, 1878.

*To all whom it may concern:*

Be it known that I, HORACE R. HAWKINS, of Akron, county of Summit, and State of Ohio, have invented certain new and useful Improvements in Seeding and Fertilizing Machines; and I do hereby declare that the following is a full, clear, and exact description of the same, reference being had to the accompanying drawings, forming a part of this specification, and in which—

Figure 1 represents a top or plan view of so much of a seeding and fertilizing machine as is necessary to illustrate my present invention. Fig. 2 represents an end view of the parts shown in Fig. 1; and Figs. 3, 4, 5, and 6 represent, upon an enlarged scale, sections and parts of the machine, as will be hereinafter more fully described.

To enable those skilled in the art to which my invention belongs to make and use the same, I will proceed to describe it in detail.

In the drawings, the part marked A represents the fertilizing box or receptacle, provided with a hinged cover, A'. Said box in this instance is provided with holes in its front and back pieces to receive the projecting ends B of the rear ends of the shafts B', as indicated in full and dotted lines, Fig. 1.

The fertilizer-box A may be secured to the ends B of the shafts in any suitable manner. In this instance it is held in place by swinging hooks a, attached to the back of the box or receptacle A, and so arranged that their hooked ends a' can be readily hooked into and removed from holes in the ends B B, as indicated in dotted lines, Fig. 1, and full lines, Fig. 3, which latter figure represents a top view of one end of the machine with the cover A' removed and the rim of the supporting-wheel and a portion of the spokes broken away to expose the working parts of the machine more fully.

Shafts B' B' are attached to and supported by axle B'', which, in turn, is supported by two wheels, C C', wheel C having connected with its hub a cam-wheel, D, in which work pins projecting from the front ends of the forked lever D', one pin being just opposite to the other, and both pointing to the center of the cam-wheel. Forked lever D' is pivoted at a''' to the projecting bearing-piece C, secured to axle B'', and also to the front of the box A.

The forks b b of lever D' are fastened together back of the pivot a'', a tongue-piece, a''', being inserted between them, while their rear ends are pivoted to the projecting end of a reciprocating plate, E, which forms the bottom of the seed or fertilizing box A, and which plate is provided with a series of holes, c, and as hub D revolves a reciprocating motion is imparted to said perforated bottom E; and as a series of thin slats or pieces, d, are arranged in the bottom of the seed or fertilizing box A, just above the upper surface of said reciprocating bottom E, the seed or fertilizing material in box A is moved from the upper surface of said plate alternately in opposite directions. Consequently clogging is prevented and a free and regular discharge is secured.

The reciprocating bottom E is made of thin metal, and is supported at each end by suitable metallic bearings, which permit it to move back and forth with but little friction.

In order to adjust the machine to deliver a greater or less amount of fertilizing material or seed, as the case may be, two slotted plates, e e, are arranged underneath the bottom E, having proper supports. The slots 1 in these plates are cut diagonally, as fully indicated in Figs. 3 and 6; and as one plate is arranged above the other, it will be seen that if the bottom plate is moved in one direction and the other in the opposite direction the openings 1 can be contracted or adjusted very accurately, since by such movement of the parts the solid parts of the bottom plate will be moved under the openings in the upper plate from one side, while the solid parts of the upper plate will be moved over the openings in the lower plate upon the other side, and for enabling the operator, while in his seat G, to move said plates in such a manner, a hand-lever, H, is pivoted at f to a hanger-piece, f', fastened to the front of the seed-box A, as indicated in Fig. 4, which is a front view of one end of box A.

The upper end of lever H extends up within easy reach of the driver or operator from his seat G, while the lower end extends down below the pivot f, and is connected, by a link, g, to the lower slotted piece e, while another link-piece, h, connects the upper slotted piece e to lever H above the pivot f, all as fully shown in Fig. 4.

It will thus be seen that when the driver takes hold of lever H (the top of which is shown broken off in Fig. 4) and moves it in one direction the slotted plates e e will be moved, by means of link-pieces g and h, in opposite directions, and consequently their openings 1 will be partly closed, as before explained, and vice versa. The driver is therefore able to adjust the machine to deliver seed of different sizes and in different quantities, as well as different quantities of fertilizing material. Then, again, when it is desired to move the machine from field to field or from place to place, said openings can be quickly closed.

The construction of this machine is such that clogging is prevented by means of the reciprocating bottom, in combination with the thin slats or strips arranged crosswise in the bottom of box A, as before explained. The construction is also such that change of temperature or the humidity of the atmosphere does not seriously affect the regularity of the delivery of the machine.

Another advantage of my machine consists in the fact that, by attaching a cam-wheel, D, to the hub of most horse-rakes and removing the rake-head, the box A can be attached to the axle, and thus much expense can be saved, as the wheels, axle, and shafts and seat of the rake can be used for both machines. This change is very conveniently made in that class of horse hay-rakes known as the "Hawkins" rake.

Having described my improved seeding and fertilizing machine, what I claim therein as new and of my invention, and desire to secure by Letters Patent, is—

1. The combination, with a seed-box, of two plates, e e, slotted diagonally and placed one above the other in the bottom of said box, a lever, H, extending above the seed-box, links g and h, uniting said lever to plates e, to adjust them, and a reciprocating perforated plate, E, placed above the plates e and under stationary slats d, substantially as and for the purpose described.

2. The combination, in a seeding-machine mounted on wheels, of a seed-box placed in the rear of the main axle, diagonally-slotted plates e, placed one above the other in said box, a perforated reciprocating plate, E, placed above said plates e, a cam, D, on the hub of said wheel, and a forked lever, D', embracing said cam and united to plate E, substantially as and for the purpose described.

3. In a seeding-machine mounted on wheels, the combination of a box in the rear of the main axle, shafts B, passing through said box, a cam, D, on the hub of one of the supporting-wheels, a forked lever embracing said cam, and a reciprocating plate, E, connected to said lever, all arranged substantially as shown and for the purpose described.

HORACE R. HAWKINS.

Witnesses:
H. W. HAWKINS,
J. W. HAWKINS.